(12) United States Patent
Poulsen et al.

(10) Patent No.: US 9,038,874 B2
(45) Date of Patent: May 26, 2015

(54) LOAD CARRIER FOOT AND A VEHICLE RACK ARRANGEMENT FOR A VEHICLE

(75) Inventors: Jonas Poulsen, Varnamo (SE); Stefan Almhill, Taberg (SE)

(73) Assignee: THULE SWEDEN AB, Hillerstorp (SE)

( * ) Notice: Subject to any disclaimer, the term of this patent is extended or adjusted under 35 U.S.C. 154(b) by 79 days.

(21) Appl. No.: 13/642,798

(22) PCT Filed: Apr. 20, 2011

(86) PCT No.: PCT/EP2011/056307
§ 371 (c)(1),
(2), (4) Date: Jan. 14, 2013

(87) PCT Pub. No.: WO2011/131711
PCT Pub. Date: Oct. 27, 2011

(65) Prior Publication Data
US 2013/0193177 A1    Aug. 1, 2013

(30) Foreign Application Priority Data

Apr. 22, 2010    (EP) .................................... 10160689

(51) Int. Cl.
*B60R 9/058*    (2006.01)
*B60R 9/052*    (2006.01)

(52) U.S. Cl.
CPC *B60R 9/058* (2013.01); *B60R 9/052* (2013.01)

(58) Field of Classification Search
CPC .......... B60R 9/058; B60R 9/045; B60R 9/052
USPC .......... 224/321, 329, 331, 319, 320, 325, 330
See application file for complete search history.

(56) References Cited

U.S. PATENT DOCUMENTS 4,688,706 A * 8/1987 Thulin ........................... 224/329
4,877,169 A   10/1989 Grim (Continued)

FOREIGN PATENT DOCUMENTS

EP    0105849 A2    4/1984
EP    0722857 A1    7/1996

(Continued)

OTHER PUBLICATIONS

International Searching Authority, International Search Report for International Application No. PCT/EP2011/056307, dated Jun. 7, 2011.

(Continued)

*Primary Examiner* — Justin Larson
*Assistant Examiner* — Corey Skurdal
(74) *Attorney, Agent, or Firm* — Novak Druce Connolly Bove + Quigg LLP (57) ABSTRACT

The present invention relates to a vehicle rack arrangement (10) comprises a load carrying bar (29 and at least a first clamp rack load carrier foot (50). The first clamp rack load carrier foot (50) comprises a grip member (80), a body (55), an attachment arrangement (90) and optionally an intermediate member (70). The load carrier foot (50) comprises a connection arrangement (50) which interacts with a stop surface (25a, 25b) of a load carrying bar (20) in a retaining manner to thereby, when operating the attachment arrangement (90), impart a force component to the load carrying bar (20) towards the body (55). A stop surface (25b) of the load carrying bar (20) prevents the connection arrangement (51) from displacement in a direction parallel with the longitudinal direction (X) of the load carrying bar (20), after assembly therewith. The present invention provides for a load carrier foot (50) having very few distinct components, which is cheap to manufacture and which enables an end user to connect the clamp rack load carrier foot (50) to a load carrying bar (20) in a simple and easy manner.

29 Claims, 3 Drawing Sheets

(56) References Cited

U.S. PATENT DOCUMENTS

| | | | | |
|---|---|---|---|---|
| 5,104,020 | A | * | 4/1992 | Arvidsson et al. ............ 224/331 |
| 5,452,831 | A | * | 9/1995 | Linnhoff ........................ 224/329 |
| 5,588,573 | A | * | 12/1996 | Mann ............................. 224/329 |
| 6,457,617 | B1 | * | 10/2002 | Andersson .................... 224/329 |
| 6,516,985 | B1 | * | 2/2003 | Lundgren ...................... 224/331 |

FOREIGN PATENT DOCUMENTS

| | | | |
|---|---|---|---|
| EP | 0736417 | A1 | 10/1996 |
| FR | 2832371 | A1 | 5/2003 |
| WO | 9400315 | A1 | 1/1994 |
| WO | 0015465 | A1 | 3/2000 |
| WO | 2008140379 | A1 | 11/2008 |
| WO | 2011131711 | A1 | 10/2011 |

OTHER PUBLICATIONS

International Preliminary Report on Patentability and Written Opinion mailed Oct. 23, 2012, in corresponding PCT patent application No. PCT/EP2011/056307.

* cited by examiner

LOAD CARRIER FOOT AND A VEHICLE RACK ARRANGEMENT FOR A VEHICLE

CROSS-REFERENCE TO RELATED APPLICATIONS

This application is a national phase application of international application no. PCT/EP2011/056307 which has an international filing date of Oct. 27, 2011 and which claims priority to EP application no. 10160689.5, filed Apr. 22, 2010, both of which are entirely incorporated by reference herein.

TECHNICAL FIELD

The present invention relates to a vehicle rack arrangement with a clamp rack load carrier foot. The clamp rack load carrier foot comprises few parts and requires few assembly steps, in an embodiment, using no screws or weld seams to connect the individual parts together.

BACKGROUND OF THE INVENTION

There are at least two different types of load carrier feet used in vehicle roof rack systems. One such type is a load carrier foot which uses a clamping force imparted between a support surface and a gripping member as primary attachment means. This type of load carrier foot is also referred to as a clamp rack foot. Load carrier feet used for rails are also considered to be of the clamp rack foot type. Another type of load carrier foot is attached on pre prepared positions on the vehicle, which generally do not need to be attached using a clamping force as primary attachment force. This type of load carrier foot is also referred to as a fix point foot.

During attachment of a load carrier foot of the clamp rack foot type, which uses a clamping force as primary attachment means to the roof of the vehicle, the load carrier foot rests on the roof and a grip member engages a ledge on the vehicle. The grip member is thereafter forced in a direction so as to impart a clamping force between the grip member and the support surface by means of attachment means, such as a screw, which retains the load carrier foot on the roof of the vehicle. This type of load carrier foot is advantageous as is can be applied to many different types of vehicles and it requires little or no manipulation of the vehicle itself, in contrast to a fix point foot.

The clamp rack load carrier foot is often mechanically advanced in terms of requiring multiple parts. One example of a clamping load carrier foot is disclosed in the PCT publication WO 2008/140379 A1. The load carrier foot in this disclosure comprises a clamping jaw which is pivotally connected to a load carrier body. The clamping jaw is further connected to the load carrier body with a screw, generally referred to as tightening means, to tighten the clamping jaw and thus impart a clamping force between the clamping jaw and the contact surface of the vehicle. The clamp rack load carrier foot is mechanically complex. The complexity imparts higher manufacturing costs and makes the logistics more difficult at the manufacturing site. This also generally requires that the vehicle roof racks are sold pre-assembled.

An end user, i.e. a person who buys, or receives, a vehicle roof rack and then attaches the vehicle roof rack to the vehicle is provided with a small number of options in terms of price and flexibility. Although it is very comfortable for the end user to buy pre assembled vehicle roof racks, it generally imparts a higher cost for the end user. This can sometimes be unwarranted as a certain amount of the assembly stages can easily be made by the end user themselves, thereby enabling the end user to buy a vehicle roof rack at a lower price. There is also a need for simplifying the assembly at a manufacturing site for those occasions a vehicle roof rack is intended to be sold in a pre assembled state. There is thus a need for a vehicle roof rack which is not mechanically complex and which is easy to assemble while not compromising safety issues such as the ability of the load carrier foot to effectively clamp on to the roof of the vehicle.

SUMMARY OF THE INVENTION

The above mentioned drawbacks are at least partly solved, at least partly reduced, or a useful alternative is provided, by the present invention. The present invention relates to a load carrying bar and a clamp rack load carrier foot comprising a body and a support surface adapted to be positioned against a first surface of a vehicle. A grip member is adapted to grip a second surface of the vehicle to enable a clamping force between the support surface and the grip member. An attachment arrangement is operable to vary the clamping force between the support surface and the gripping member. The clamp rack load carrier foot is adapted to receive a load carrying bar on a load carrying bar receiving surface.

The clamp rack load carrier foot comprises a connection arrangement arranged in working cooperation with the attachment arrangement. The clamp rack load carrier foot is coupled to the load carrying bar by means of a relative displacement of at least a part of the connection arrangement with respect to the load carrying bar to a first position, when operating the attachment arrangement, when the clamp rack load carrier foot has been mounted on the vehicle and when the at least a part of the connection arrangement is in the first position, the connection arrangement imparts the load carrying bar with;

a turning force, imparting a first force component to the load carrying bar in a direction towards the vehicle, and;
    a second force component in a first direction (A) parallel with the longitudinal direction (X) of the load carrying bar, to thereby retain the load carrying bar on the load carrying bar receiving surface.

The coupling of the connection arrangement to the load carrying bar can be easily made be by an end user or at the manufacturing site. The connection arrangement itself is thus the retaining means, retaining the load carrying bar on the clamp rack load carrying foot, without the use of additional screws or bolts. During assembly, the turning force of the connection arrangement and the second force component in the first direction cooperates with the load carrying bar so as to retain the load carrying bar to the clamp rack load carrier foot.

The present invention provides for a vehicle rack arrangement with a clamp rack load carrier foot which comprises a low number of distinct components, i.e. less than 10 distinct components, preferably less than 8 distinct components. By using few components, a simple construction is provided which even permits an end user assembly, a cheap construction and reduced logistic related problems which can occur when operating a higher number of components. Very few parts are thus needed to provide a safe, yet rigid, connection for a load carrier foot.

According to an embodiment the connection arrangement comprises a grip portion adapted to extend into an opening of the load carrying bar, wherein at least the first grip surface is arranged on the grip portion. The first grip surface can thus interact with the interior surface of the load carrying bar in a retaining manner. Specifically, only the bottom interior surface is used. The opening is advantageously an aperture.

The grip member can be arranged in working cooperation with an intermediate member via the attachment arrangement. The intermediate member comprises the grip portion. This enables an embodiment in which the intermediate member retains the load carrying bar on the clamp rack load carrier foot and which is operable using the attachment arrangement.

According to an aspect of the invention, the grip portion comprises both the first and second grip surfaces. It has been found that this embodiment enables a very sturdy and rigid construction especially if the grip portion is made from a metal material such as steel. Optionally, the second grip surface can be arranged on the body of the clamp rack load carrier foot.

According to an aspect of the invention, the first grip surface is arranged at an angle α with respect to the second grip surface. The first grip surface is advantageously arranged parallel with the Z-X plane and the second grip surface is advantageously arranged with an angle thereto. The angle α is advantageously 15-75 degrees, preferable 25-65 degrees with respect to the first grip surface, i.e. to the Z-X plane. By arranging the second grip surface at an angle with respect to the first grip surface, parts of the load carrying bar can be used to wedge the grip portion e.g. to an opening in the load carrying bar.

According to an aspect of the invention, the intermediate member comprises an abutment surface enabling leverage to the grip member at a lever point. The leverage provides for a relatively high clamping force. As an alternative, the body of the clamp rack load carrier foot can comprises an abutment surface for enabling leverage to the grip member at a lever point. Optionally both the intermediate member and the body can comprise an abutment surface for the above mentioned purpose.

According to an aspect of the invention, the attachment arrangement is pivotally connected to the intermediate member at an attachment arrangement working point. In an embodiment, the grip member comprises a first and a second transverse end and the lever point is arranged in the proximity of the first transverse end. Advantageously, the grip portion can be arranged at the second transverse end of the grip member. This utilizes the full length of the grip member and imparts a good leverage. The attachment arrangement operates via the grip member at a working point, which in an embodiment can be an aperture, slot or the like. The working point just mentioned is advantageously arranged substantially between the lever point and the grip portion of the grip member.

The attachment arrangement is advantageously a screw operating with a nut; the nut is pivotally attached to the intermediate member.

According to an aspect of the invention, the body of the clamp rack load carrier foot comprises an abutment surface adapted to cooperate with an opening of the load carrying bar. The abutment surface, preferably arranged on an upper portion of the clamp rack load carrier foot, is adapted to cooperate with a part of the intermediate member to attach the clamp rack load carrier foot to the load carrying bar, advantageously in a cooperative manner with the grip portion of the intermediate member. This enables a user to assemble the clamp rack load carrier foot with a load carrying bar in a simple manner.

The abutment surface can be adapted to provide for a snap-in arrangement. The snap-in arrangement is adapted to cooperate with a part of the intermediate member to couple the clamp rack load carrier foot to the load carrying bar, releasably or permanently. The part is advantageously the grip portion of the intermediate member. By the term permanently is hereby meant that the objects cannot be detached from one another after attachment without breaking at least a part of one of the objects or the connection formed between the two objects. According to an aspect of the invention, the abutment surface, or optionally the snap-in arrangement, is adapted to cooperate with a part of the opening, advantageously the side edge of the opening.

The body of the clamp rack load carrier foot comprises a cavity in which the intermediate member is at least partly enclosed after assembly. A support structure can further be provided in the body. The support structure improves the rigidity of the body. In this embodiment, the intermediate member is advantageously arranged partly inside of said support structure. The support structure and the body are advantageously formed by one unitary piece of material.

According to an aspect of the invention, a first and a second clamp rack load carrier foot are connected to a load carrying bar to form a vehicle rack arrangement, the load carrying bar has a longitudinal direction and at least one stop surface. The at least one stop surface is partly formed by an opening in the load carrying bar, such as a transverse side edge of the opening of the load carrying bar. The vehicle rack arrangement is advantageously a vehicle roof rack arrangement.

The load carrying bar can comprise a plurality of openings. Each opening forms, or at least partly forms, a designated stop surface for the grip portion of the intermediate member. This enables the clamp rack load carrier foot to be positioned in a plurality of pre determined positions. Advantageously, at least three openings are arranged on the load carrying bar.

According to an aspect of the invention, the attachment arrangement extends between and interconnects the grip member and the connection arrangement, e.g. the intermediate member. When the connection arrangement is provided by an intermediate member, and the grip portion is arranged on the intermediate member, or optionally formed by a part of the intermediate member, very few parts are used to provide the clamping force retaining the clamp rack load carrier foot to the vehicle.

According to an aspect of the invention, the intermediate member comprises a grip portion adapted to interact with a stop surface of the load carrying bar in a retaining manner to thereby, when operating the attachment arrangement, impart a force component to the load carrying bar at least towards the body. The force component provides for the clamping force. The grip portion of the intermediate member is adapted to interact with the stop surface of the load carrying bar so as to prevent the grip portion from displacement in a direction parallel with the longitudinal direction of the load carrying bar, after assembly therewith. The stop surface of the load carrying bar can be formed by an opening, or through aperture, in the load carrying bar. In this embodiment, the load carrying bar provides for the stop surface and physically prevents the grip portion from displacement upon tightening the attachment arrangement.

It should be noted that when the grip portion of the intermediate member, or the connection arrangement, is releasably coupled to the load carrying bar, the load carrying bar and the body of the clamp rack load carrier foot can be disassembled when the attachment arrangement is loosened, i.e. when dismounting the clamp rack load carrier foot from a vehicle. In some cases a snap in function can be arranged between the body of the clam rack load carrier foot and the load carrying bar, however, the main retaining mechanism retaining the load carrying bar to the body of the clamp rack load carrier foot is due to the grip portion of the intermediate member.

BRIEF DESCRIPTION OF THE DRAWINGS

The present invention will be described in greater detail with reference to the accompanying figures in which.

DETAILED DESCRIPTION OF PREFERRED EMBODIMENTS

Figure 1:
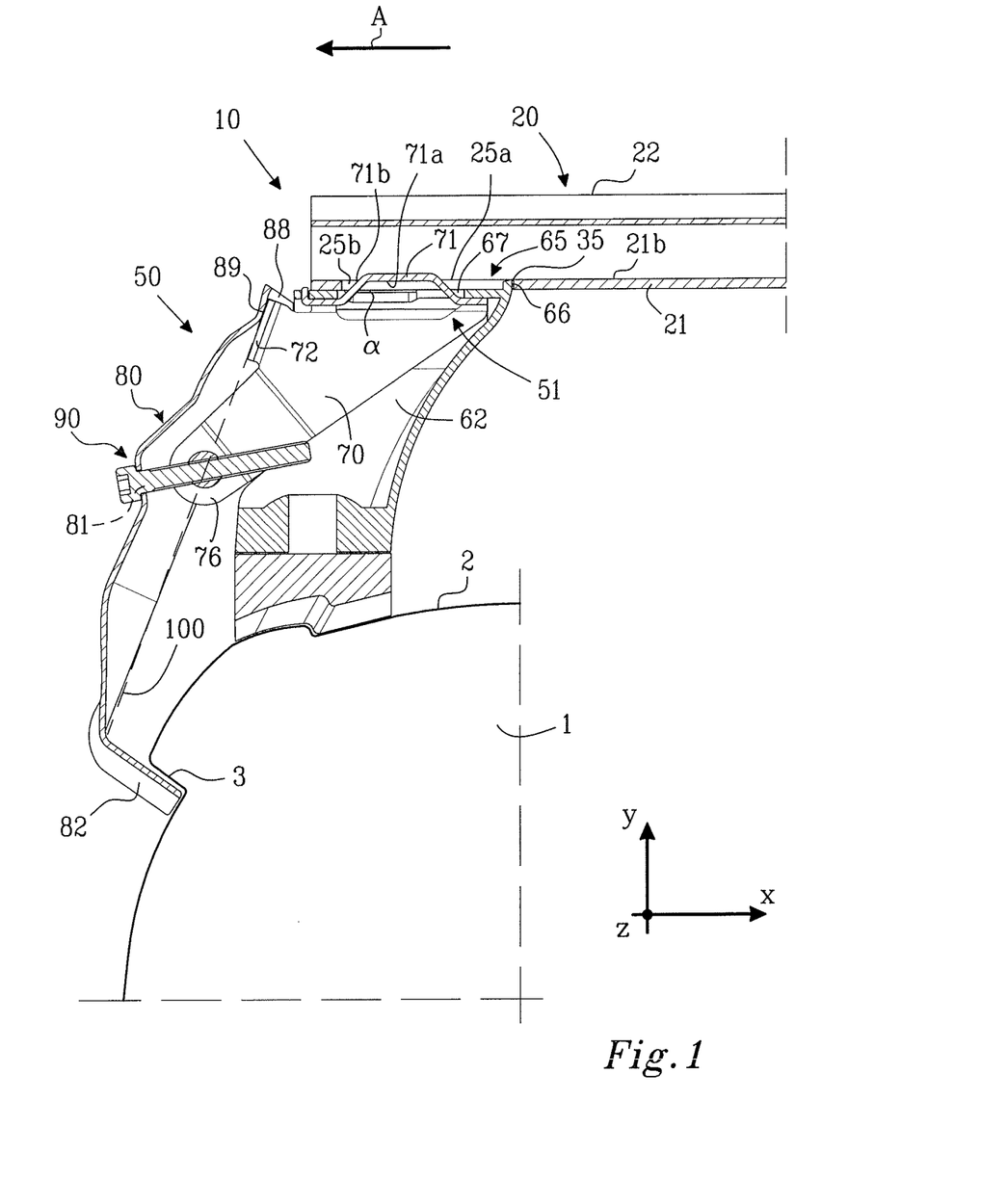
FIG. 1 shows a clamp rack load carrier foot according to the present invention in cross section.

FIG. 1 shows a cross section of parts of a vehicle 1 having a roof 2 to which a vehicle top rack arrangement 10 is connected. The vehicle top rack arrangement 10 is adapted to receive and carry a load such as; a cargo load such as bricks, pallets, timber, boards, pipes or the like; sports gear such as skis, snowboards, bicycles, canoes, kayaks or the like; vehicle accessories such as roof boxes, secondary load carrying related equipment such as load stops, load securing arrangements or the like.

The vehicle top rack arrangement comprises a load carrying bar 20, also referred to as a load carrier bar (20), and a first and a second clamp rack load carrier foot, hereafter only referred to as load carrier feet. Only the first load carrier foot 50 is shown in FIG. 1.

FIG. 1 further defines the X, Y and Z directions used herein. The Z direction extends in the same direction as the width of the load carrying bar 20, and the forward and rearward directions of the vehicle after the vehicle top rack arrangement 10 has been assembled thereto. The X direction extends in the same direction as the longitudinal direction of the load carrying bar 20, and the transverse direction of the vehicle 1 after assembly thereto. The Y direction extends in the same direction as the height, or the vertical direction of the load carrying bar 20 or the vehicle 1. The Z-X directions form a horizontal plane, when the vehicle is parked or travelling on flat ground.

In the shown embodiment, the load carrying bar 20 is a straight bar with no accessories attached thereto. The load carrier bar 20 can be manufactured from any suitable material but steel, aluminium, and/or carbon fibre based materials are preferred.

Figure 2:
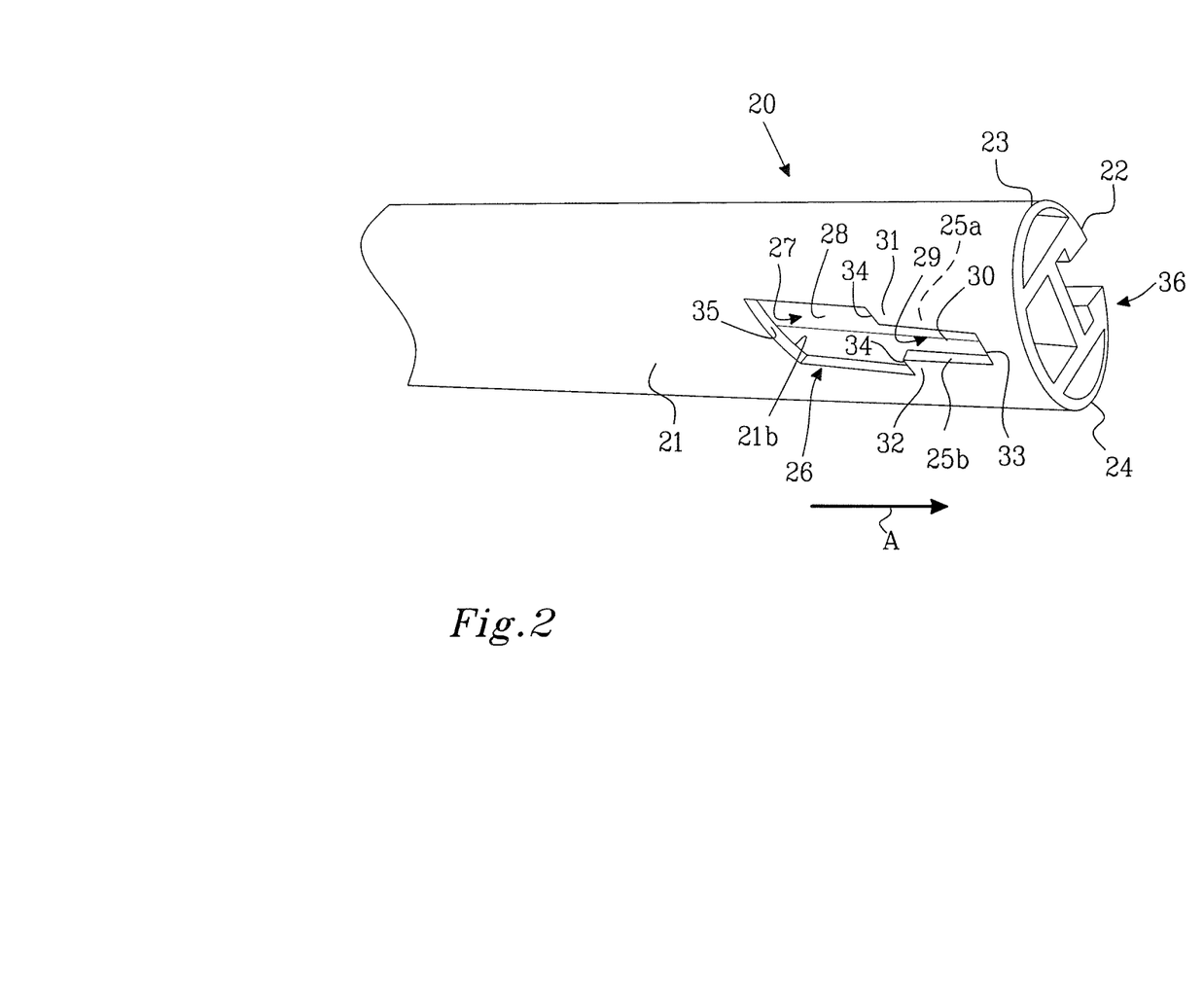
FIG. 2 shows parts of a load carrying bar which can be used with a load carrier foot according to the present invention.

FIG. 2 shows the load carrying bar 20 with a first end 36 in perspective and with a view towards the surface positioned to face the vehicle 1 after assembly; hereafter referred to as the bottom exterior surface 21. The load carrying bar also comprises a bottom interior surface 21b. Opposite to the bottom exterior surface 21, formed by a bottom wall, is a top exterior surface 22, formed by a top wall. The top exterior surface 22 forms a load receiving surface 22. The load carrying bar 20 comprises a substantially oval cross section providing two smooth side edges 23, 24 which will result in low wind resistance when the vehicle 1 is moving.

The load carrier bar 20 comprises a first and a second stop surface 25a, 25b, in this embodiment partly formed by an aperture 26 in the wall of the load carrier bar 20. The stop surfaces 25a, 25b are adapted to be in working cooperation with the load carrier foot 50 and a connection arrangement 51 of the load carrier foot 50, as will be described in greater detail herein.

The first stop surface 25a can be partly or fully formed by a hook member, a pin, an opening such as an aperture, open ended slot, a cavity, or the like. A preferred opening is an aperture, extending through the wall of the load carrying bar. In the shown embodiment in FIG. 1-2, the first stop surface 25a is partly formed by the aperture 26, i.e. the material defining the aperture 26. As is noticed, the aperture 26 comprises a first section 27 having a first opening area 28 and a second section 29 having a second opening area 30. The first opening area 28 is larger than the second opening area 30. More importantly, the second section 29 defines, or forms, a first and a second stop flange 31, 32 which after assembly cooperate with the connection arrangement 51 of the load carrier foot 50. The first and the second stop flanges 31, 32 are formed by the material surrounding the aperture 26, more specifically from the different forms of the first and the second sections 27, 29.

The second stop surface 25b is, in the shown embodiment of the present invention, formed by the transverse side edge 33 of the second section 29. Alternative stop surfaces could be formed by the corresponding remaining transverse side edges 34 of the first section 28. The second stop surface 25b is adapted to prevent the connection arrangement from being displaced in the X direction, i.e. the longitudinal direction of the load carrying bar 20, and more specifically in a first direction of the X direction, indicated by an arrow A in FIGS. 1 and 2. The first direction of the longitudinal direction of the load carrying bar 20 can be said to be towards the first end 36 of the load carrying bar 20. The load carrying bar 20 is advantageously arranged with at least one stop surface, or at least two stop surfaces, or three or more stop surfaces.

Figure 3:
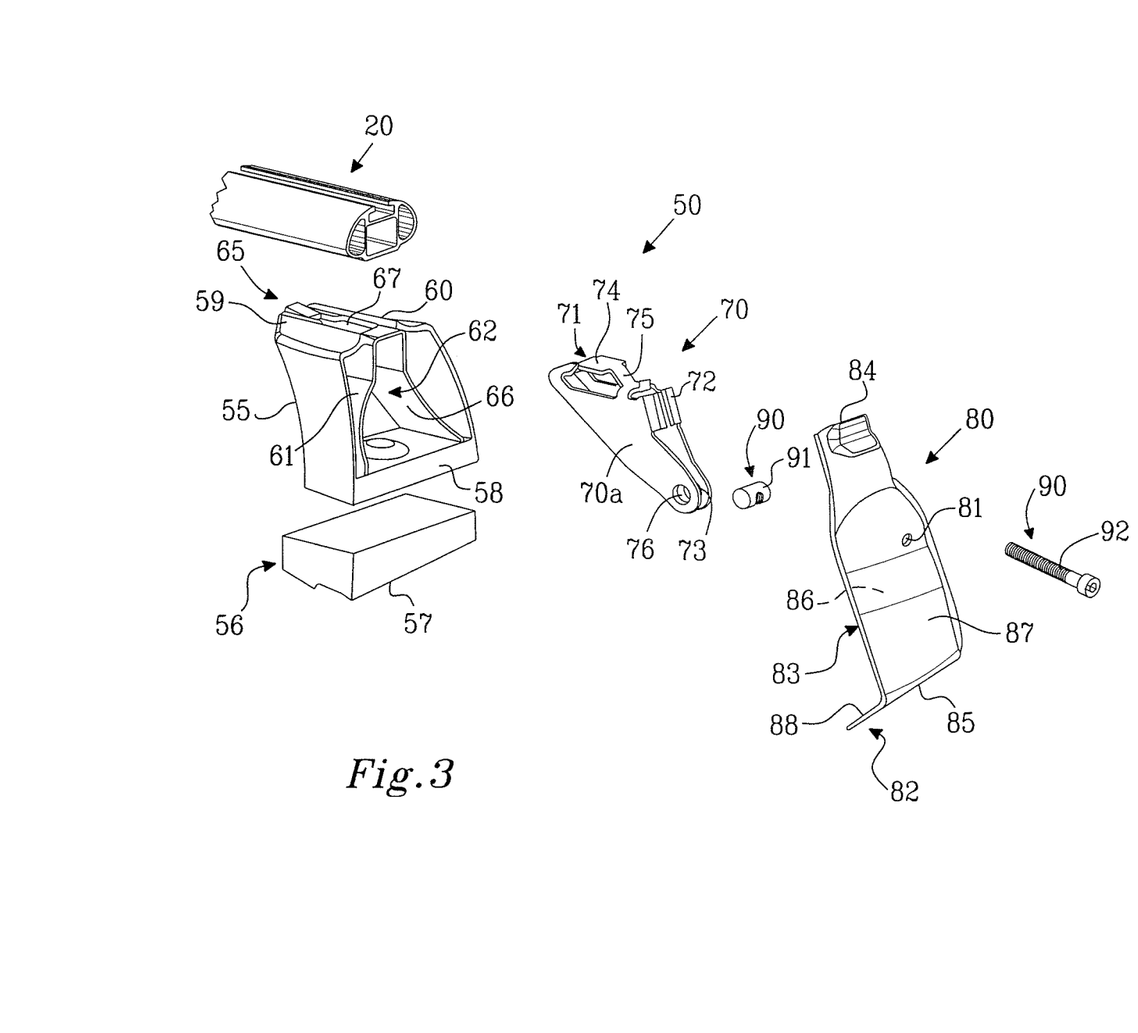
FIG. 3 shows parts of a load carrying bar and a load carrier foot according to the present invention in an exploded view.

FIG. 3 shows parts of the load carrying bar 20 and the components of the load carrier foot 50 in exploded view. As is noticed, the vehicle top rack arrangement 10 and the load carrier foot comprises very few components. In the shown embodiment, only six separate components are used in the load carrier foot 50, none of them being permanently attached to each other. The load carrier foot 50 comprises a body 55 adapted to carry load carrying bar 20 and the applied load thereon. A flexible support pad 56 forms a support surface 57 adapted to be positioned against a first surface of the vehicle 1, preferably the roof 2 of the vehicle 1. The flexible support pad 56 comprises a flexible and friction increasing material such as natural- or synthetic rubber, or any rubber like material. The flexible support pad 56 protects the roof 2 of the vehicle 1 from deformation and wear during use. The support surface 57 can be integrally formed with the body 55 or be as a separate component, e.g. arranged on a support pad 56 as disclosed herein.

The body 55 can advantageously be made form a polymeric material such as polypropylene, or carbon fibre reinforced polymeric material, although other materials are possible such as steel or aluminium. The body 55 comprises a base 58 intended to be positioned adjacent the support pad 56, an upper portion 59 adapted to receive and carry the load carrier bar 20. The upper portion 59 comprises a load carrying bar receiving surface 60. A support structure 61 connects the base 59 with the upper portion 59 and imparts rigidity to the body 55. The body 55, formed by a housing, comprises an aperture 67 adapted to be positioned in working cooperation, i.e. in an overlapping manner, with the aperture 26 of the load carrying bar 20.

In an embodiment, the aperture 67 of the body 55 can form a stop surface for the connection arrangement. Hence the body 55 of the load carrier foot 50 can be provided with a stop surface for preventing displacement of the connection arrangement in the first X direction.

The body 55 further comprises a cavity 66 defined partly by the support structure 61 inside the body 55. The intermediate member 70 is positioned partly inside the cavity 66 of the body 55 after assembly, and extends through the aperture 67 of the body 55, and into the load carrying bar 20.

An intermediate member 70 is adapted to be in working cooperation with a grip member 80 and an attachment arrangement 90. To enable a high tensile strength, the intermediate member 70 is preferably a metal bracket advantageously made by form pressing sheet steel. The grip member 80 and the attachment arrangement 90 will be described in greater detail below.

The intermediate member 70 comprises a grip portion 71, adapted to be connected with the load carrying bar 20, and specifically to be in working cooperation with the first stop surface 25a of the opening 26 of the load carrying bar 20, shown in FIG. 2. In the shown embodiment, the grip portion 71 is adapted to interact with the first stop surface 25a so as to permit the load carrier foot 50 to be retained on a surface of the vehicle 1. It thus imparts a force component in the Y direction, i.e. in a direction towards the body 55 of the load carrier foot as the attachment arrangement 90 is operated. The intermediate member 70 comprises an elongated body 70a comprising the grip portion 71, an abutment surface 72 and an attachment arrangement working point 73.

The first and second stop flanges 31, 32 are, as mentioned, adapted to be in working cooperation with the grip portion 71 so as to force the load carrying bar 20 in a direction towards the roof 2 of the vehicle 1. The grip portion 71 of the intermediate member 70 thus rests on the interior surface of the first load carrier bar 20. More precisely, the grip portion 71 of the intermediate member 70 rests only on the bottom interior surface 21b of the first load carrier bar 20, although a part of it is positioned directly adjacent the transverse side edge 33 of the opening 26, which forms the second stop surface 25b in this case.

The grip portion 71 comprises a grip plate 74 adapted to cooperate with the first stop surface 25a and the first and second stop flanges 31, 32 of the load carrying bar 20 after assembly thereto. The grip plate 74 has an extension in the horizontal plane Z-X, extending perpendicular to the elongation of the elongated body 70a. In this case the parts, or the surface of the grip plate 74, which faces the bottom interior surface 21b of the first load carrier bar 20, forms the first grip surface 71a. The grip plate 74 is further raised a distance d from the elongated body 70a so as to readily reach into the load carrier bar 20. The distance d is advantageously 3-20 mm. The grip plate 74 is during assembly inserted into the first section 27 of the opening 26 of the load carrying bar 20 and thereafter displaced in the first X direction, indicated by arrow A in FIGS. 1 and 2, into the second section 29 of the opening 26 of the load carrying bar 20.

In the second section 29, arms 75 holding the grip plate 74 are effectively prevented from further displacement in the first X direction by the second stop surface 25b. In this case, the arm 75 partly forms the second grip surface 71b. The second grip surface 71b is advantageously arranged at an angle α of 90 degrees, optionally >90 degrees, more advantageously of 110-160 degrees. In this case the angle α should be less than 180 degrees however, with respect to the first grip surface 71a.

The abutment surface 72 of the intermediate member 80 is adapted to cooperate with the grip member 80 during and after attachment to the vehicle 1. The abutment surface 72 abuts the grip member 80 so as to provide a lever mechanism for the grip member 80. This makes the grip member 80 effectively impart a high clamping force and thereby securely grip the vehicle 1.

The attachment arrangement working point 73 can be a pivot point at which at least one aperture 76, in this case two apertures, cooperates with the attachment arrangement 90, in this case a nut 91 and a screw 92. The nut 91 is in the form of a pin like nut.

The grip member 80 is advantageously a metal bracket having an aperture 81, functioning as a working point, through which the screw 92 cooperates with the intermediate member 70. The grip member 80 comprises a grip portion 82 adapted to grip a second surface 3 of the vehicle 1. The grip member 80 has a substantially elongated body 83 having a first and a second transverse end 84, 85, an inner side 86, facing the body 55 of the load carrier foot 50, and an outer side 87 facing away from the body 55 of the load carrier foot 50; after assembly. The second end 85 of the grip member 80 comprises the grip portion 82. The grip portion 82 comprises a grip surface 87 formed by a fold in the proximity of the second end 85.

The grip member 80 also comprises an abutment surface 88, as shown in FIG. 1, which is adapted to cooperate with the abutment surface 72 of the intermediate member 70 during attachment to the vehicle 1. FIG. 1 shows the load carrier foot 50 in cross section when the load carrier foot 50 is in an engaged position, i.e. when the load carrier foot 50 is attached to the vehicle 1 for transporting a cargo on the first load carrier bar 20.

As the attachment arrangement 90, in this case the screw 92, is operated to increase the clamping force between the grip portion 82 of the grip member 80 and the support surface 57 of the body 55, the abutment surface 88 of the grip member 80 and the abutment surface 72 of the intermediate member 70 are positioned directly adjacent each other at a lever point 89. Leverage is thereafter achieved when further operating the attachment arrangement 90 to increase said clamping force. The leverage of the grip member 80 is operable via the aperture 81 of the grip member 80 and the abutment surfaces 88, 72 of the grip member 80 and the intermediate member 70. The aperture 81 thus forms a cooperative point 81 for the attachment arrangement 90. The cooperative point 81 for the attachment arrangement 90 is advantageously arranged between the first and the second transverse ends 84, 85, and within a distance of 30-70%, advantageously about 40-60%, of the total length of the grip member 80 from the lever point 89. The distance between the lever point 89 and the grip portion 82 of the grip member 80 is indicated by the dashed line 100 in FIG. 1. The dashed line extends through the lever point 89 and the fold of the grip portion 82 of the grip member 80. The aperture 81, forming a cooperative point 81, is advantageously displaced from the dashed line 100 as the grip member 80 has the form of an arc shaped curvature in the longitudinal direction of the grip member 80 and having an apex pointing away from the load carrier foot 50 after assembly. Optionally or additionally, the grip member 80 has a transverse direction which advantageously comprises an arc shaped curvature, having an apex pointing away from the load carrier foot 50 after assembly. This improves the rigidity of the grip member 80.

In an embodiment, the abutment surface 82 of the grip member 80 and the abutment surface 72 of the intermediate member 70 are separated from each other by a distance d, which can be of the order of 1-40 mm, forming two separate abutment points. Both these points are in that case considered to be the lever point 89. The lever point 89 can, in an embodiment of the invention, be formed between the abutment surface 88 of the grip member 80 and an abutment surface of the body 55 of the load carrier foot 50. Such an abutment surface is advantageously arranged in the proximity of the upper portion 59 of the load carrier foot 50.

Hereafter the function and assembly of the load carrier foot will be described in greater detail. As is seen in FIG. 1, connection arrangement 51, in this case the coupling portion 71 of the intermediate member 70, is inserted in the aperture 26 of the load carrying bar 20 and displaced with respect to the load carrying bar 20 in the first direction A to a first position, thereby interacting with the first and second stop surfaces 25a, 25b, so as to permit attachment of the load carrier foot 50 to a surface of the vehicle 1. The connection arrangement 51 is thus arranged in working cooperation with the attachment arrangement. When operating the attachment arrangement 90, the connection arrangement 51, and thus the coupling portion 71, imparts the load carrying bar with a turning force, imparting a first force component to the load carrying bar in the Y direction towards the vehicle 1. A second force component is imparted in the first direction A parallel with the longitudinal direction X of the load carrying bar. This retains the load carrying bar 20 to the load carrying bar receiving surface 60 in a very firm and safe manner. The opening 26 and the surfaces formed by the opening 26 interacts with the imparted force components.

As can be noted in FIGS. 1 and 3, the body 55 of the load carrier foot 50 comprises an abutment surface, in this case in the form of a snap-in arrangement 65, which cooperates with a second transverse side edge 35 of the opening 26 of the load carrying bar 20. The second transverse side edge 35 of the opening 26 is positioned directly opposite the transverse side edge 33 of the second section 29 of the opening 26 of the load carrying bar 20. The snap-in arrangement 65 comprises a protrusion 66 operable to interact with the second transverse side edge 35 of the opening 26 after the coupling portion 71 of the intermediate member 70 has been inserted in the opening 26. The snap-in arrangement 65 enables the body 55 of the first load carrier foot 50 to be temporarily attached to the first load carrier bar 20, suitable for storage in e.g. a garage or in the trunk of a car.

The load carrying bar 20 can comprise at least one stop surface 25a, 25b, or a plurality of stop surfaces. At least two stop surfaces 25a, 25b are preferably positioned in at each end of the load carrying bar and adapted to cooperate with a load carrier foot. At least one end of the load carrying bar can comprise a plurality of pairs of stop surfaces 25a, 25b to enable a variable length between a first and a second load carrier foot. Optionally each end of the load carrying bar can comprise a plurality of stop surfaces to enable a variable length between a first and a second load carrier foot.

The stop surfaces mentioned above can advantageously be defined by an opening, or a plurality of openings, in the load carrying bar. The openings can be of different forms or the same form. Suitable forms can be oval, circular, polygon forms, square, rectangular forms or the like. An important aspect of each form is however that it forms a pair of stop surfaces for the connection arrangement of the load carrying foot, e.g. an intermediate member, to interact with, as described above.

It should be noted that the expression "bar" as used herein not necessarily refer to a straight component that is longer than it is wide, but may include a component of any shape and size that is arranged to be supported on at least one clamp rack load carrier foot. A straight longitudinal bar is however a preferred bar.

What is claimed is:

1. A vehicle rack arrangement comprising a load carrying bar and at least a first clamp rack load carrier foot, said clamp rack load carrier foot comprising a body comprising a support surface adapted to be positioned against a first surface of a vehicle, a grip member adapted to grip a second surface of said vehicle;
   an attachment arrangement being operable to operate said grip member;
   said body comprising a load carrying bar receiving surface adapted to receive a load carrying bar having a longitudinal direction; and
   said clamp rack load carrier foot comprising a connection arrangement arranged in working cooperation with said attachment arrangement and adapted to be coupled to said load carrying bar by means of a relative displacement of at least a part of said connection arrangement with respect to said load carrying bar to a first position,
   wherein when operating said attachment arrangement, when said clamp rack load carrier foot has been mounted on said vehicle and when said at least a part of said connection arrangement is in said first position, said connection arrangement imparts said load carrying bar;
   wherein said connection arrangement comprises a grip portion adapted to be inserted into an opening on an underside of said load carrying bar in a predetermined direction, said grip portion comprising a first grip surface and a second grip surface, said first and second grip surfaces forming an angle between 90 and 180 degrees and being adapted to cooperate with a first stop surface and a second stop surface forming said opening in said load carrying bar, said second stop surface located intermediate the second grip surface and a distal end of said load carrying bar, to thereby retain said load carrying bar on said load carrying bar receiving surface.

2. The vehicle rack arrangement according to claim 1, wherein said grip member is arranged in working cooperation with an intermediate member via said attachment arrangement, said intermediate member comprising said grip portion.

3. The vehicle rack arrangement according to claim 2, wherein said attachment arrangement is pivotally connected to said intermediate member at an attachment arrangement working point.

4. The vehicle rack arrangement according to claim 2, wherein said intermediate member comprises an abutment surface enabling leverage to said grip member at a lever point.

5. The vehicle rack arrangement according to claim 1, wherein said body of said clamp rack load carrier foot comprises an abutment surface enabling leverage to said grip member at a lever point.

6. The vehicle rack arrangement according to claim 1, wherein said grip member is in working cooperation with said attachment arrangement at a point and wherein said grip member comprises a first and a second transverse end and that a lever point is arranged in the proximity of said first transverse end and a grip portion is arranged at said second transverse end of said grip member.

7. The vehicle rack arrangement according to claim 1, wherein said load carrying bar comprises an opening and wherein said body of said first load carrier foot comprises an abutment surface adapted to cooperate with said opening of said load carrying bar, said abutment surface is adapted to cooperate with a part of said connection arrangement to couple said load carrier foot to said load carrying bar.

8. The vehicle rack arrangement according to claim 7, wherein said abutment surface is a snap-in arrangement, said snap-in arrangement is adapted to cooperate with a part of said connection arrangement to couple said load carrier foot to said load carrying bar.

9. The vehicle rack arrangement according to claim 8, wherein said snap-in arrangement is adapted to cooperate with a side edge of said opening.

10. The vehicle rack arrangement according to claim 2, wherein said body comprises a cavity and said intermediate member is at least partly enclosed by said cavity after assembly.

11. The vehicle rack arrangement according to claim 1, wherein said load carrying bar comprises a plurality of openings, said plurality of openings being adapted to receive a connection arrangement of a load carrier foot.

12. The vehicle rack arrangement according to claim 1, wherein said load carrying bar is adapted so that said relative displacement of at least a part of said connection arrangement is done in said longitudinal direction with respect to said load carrying bar to said first position.

13. A vehicle top rack arrangement comprising a load carrying bar and at least a first clamp rack load carrier foot comprising a body comprising a support surface adapted to be positioned against a first surface of a vehicle, a grip member adapted to grip a second surface of said vehicle, said grip member being arranged in working cooperation with an intermediate member via an attachment arrangement,
wherein said intermediate member comprises a grip portion adapted to interact with a stop surface of a load carrying bar in a retaining manner, wherein said grip portion of said intermediate member is adapted to interact with said stop surface of said load carrying bar so as to prevent said grip portion from displacement in a direction parallel with said longitudinal direction of said load carrying bar, after assembly therewith;
wherein said body of said first load carrier foot comprises an abutment surface adapted to cooperate with an opening of said load carrying bar, said abutment surface is adapted to cooperate with a part of said intermediate member to couple said load carrier foot to said load carrying bar; and
wherein said abutment surface is in the form of a snap-in arrangement adapted to cooperate with a part of said intermediate member to couple said load carrier foot to said load carrying bar.

14. The vehicle top rack arrangement according to claim 13, wherein said intermediate member comprises an abutment surface for enabling leverage to said grip member at a lever point.

15. The vehicle top rack arrangement according to claim 13, wherein said body of said clamp rack load carrier foot comprises an abutment surface for enabling leverage to said grip member at a lever point.

16. The vehicle top rack arrangement according to claim 13, wherein said attachment arrangement is pivotally connected to said intermediate member at an attachment arrangement working point.

17. The vehicle top rack arrangement according to claim 13, wherein said grip member is in working cooperation with said attachment arrangement at a point and wherein said grip member comprises a first and a second transverse end and that said lever point is arranged in the proximity of said first transverse end, and a grip portion is arranged at said second transverse end of said grip member.

18. The vehicle top rack arrangement according to claim 13, wherein said snap-in arrangement is adapted to cooperate with a side edge of said opening.

19. The vehicle top rack arrangement according to claim 17, wherein said part of said intermediate member is said grip portion.

20. The vehicle top rack arrangement according to claim 13, wherein said body comprise a cavity and in that said intermediate member is at least partly enclosed by said cavity after assembly.

21. The vehicle top rack arrangement according to claim 13, wherein said at least one stop surface is partly formed by an opening in said load carrying bar.

22. The vehicle top rack arrangement according to claim 21, wherein said stop surface is a transverse side edge of said opening of said load carrying bar.

23. The vehicle top rack arrangement according to claim 21, wherein said load carrying bar comprises a plurality of openings adapted for receiving said grip portion.

24. The vehicle top rack arrangement according to claim 23, wherein said load carrying bar comprises at least three openings adapted to receive said grip portion.

25. The vehicle top rack arrangement according to claim 13, wherein said grip portion of said intermediate member is adapted to be coupled to said load carrying bar by means of a relative displacement with respect to said load carrying bar to a first position.

26. The vehicle top rack arrangement according to claim 25, wherein said grip portion of said intermediate member is adapted to be releasably coupled to said load carrying bar by means of a relative displacement with respect to said load carrying bar to a first position.

27. The vehicle top rack arrangement according to claim 13, wherein said grip portion of said intermediate member is the primary retaining means to retain said load carrying bar to said body.

28. The vehicle top rack arrangement according to claim 27, wherein said grip portion of said intermediate member is the only retaining means to retain said load carrying bar to said body.

29. A vehicle rack arrangement comprising a load carrying bar and at least a first clamp rack load carrier foot, said clamp rack load carrier foot comprising a body comprising a support surface adapted to be positioned against a first surface of a vehicle, a grip member adapted to grip a second surface of said vehicle;
an attachment arrangement being operable to operate said grip member;
said body comprising a load carrying bar receiving surface adapted to receive a load carrying bar having a longitudinal direction; and
said clamp rack load carrier foot comprising a connection arrangement arranged in working cooperation with said attachment arrangement and adapted to be coupled to said load carrying bar by means of a relative displacement of at least a part of said connection arrangement with respect to said load carrying bar to a first position,
wherein when operating said attachment arrangement, when said clamp rack load carrier foot has been mounted on said vehicle and when said at least a part of said connection arrangement is in said first position, said connection arrangement imparts said load carrying bar;
wherein said connection arrangement comprises a first and second grip surface, said first and second grip surfaces being adapted to cooperate with a first stop surface and a second stop surface of said load carrying bar to thereby retain said load carrying bar on said load carrying bar receiving surface;
wherein said load carrying bar comprises an opening and wherein said body of said first load carrier foot comprises an abutment surface adapted to cooperate with said opening of said load carrying bar; and wherein said abutment surface is a snap-in arrangement, said snap-in arrangement adapted to cooperate with a part of said connection arrangement to couple said load carrier foot to said load carrying bar.

* * * * *